(12) United States Patent
Smith

(10) Patent No.: US 6,412,211 B1
(45) Date of Patent: Jul. 2, 2002

(54) APPARATUS AND METHOD FOR IMPROVING FLY FISHING CASTING

(76) Inventor: Steven L. Smith, 3227 Sewell Mill Rd., Marietta, GA (US) 30062

( * ) Notice: Subject to any disclaimer, the term of this patent is extended or adjusted under 35 U.S.C. 154(b) by 0 days.

(21) Appl. No.: 09/602,029

(22) Filed: Jun. 23, 2000

Related U.S. Application Data

(60) Provisional application No. 60/150,220, filed on Aug. 23, 1999.

(51) Int. Cl.$^7$ .......................... A01K 97/00; A63B 71/00; A63B 69/00
(52) U.S. Cl. ............................................. 43/4; 273/140
(58) Field of Search ......................... 43/4, 45; 273/340, 273/350, 140

(56) References Cited

U.S. PATENT DOCUMENTS

| | | | | |
|---|---|---|---|---|
| 2,320,145 A | * | 5/1943 | La Due | 273/140 |
| 2,482,057 A | * | 9/1949 | Fincke | 43/4 |
| 3,463,494 A | | 8/1969 | Stroh | 273/101 |
| 3,788,641 A | | 1/1974 | Lemelson | 273/1 M |
| 4,158,927 A | * | 6/1979 | Capra | 43/4.5 |
| 4,976,439 A | | 12/1990 | Kraemer | 273/350 |
| 5,031,908 A | | 7/1991 | Spector | 273/447 |
| 5,110,136 A | | 5/1992 | Land | 273/346 |
| 5,297,355 A | | 3/1994 | O'Brien | 43/4 |
| 5,335,911 A | | 8/1994 | Brown | 273/140 |
| 5,397,131 A | | 3/1995 | Kraemer | 273/350 |
| 5,639,093 A | | 6/1997 | Law et al. | 273/371 |
| 5,657,995 A | | 8/1997 | Howard | 273/333 |
| 5,896,693 A | | 4/1999 | Ray | 43/4 |

* cited by examiner

*Primary Examiner*—Kurt Rowan
(74) *Attorney, Agent, or Firm*—Thomas, Kayden, Horstemeyer & Risley

(57) ABSTRACT

The present invention provides an apparatus and method for improving the casting ability of a fly fisherman. The apparatus preferably comprises a fly rod with fly line and a fly replica attached to an end of the fly line. The fly replica preferably further comprises an adhesive material on a surface of said fly replica. The preferred embodiment also comprises a target area for receiving the fly replica. The target area preferably comprises a target and a fish replica. The target has a base portion and a second adhesive material on an upper surface of the target base portion. The fish replica is positioned adjacent to the target. The fish replica is secured by support elements. The support elements keep the fish replica in an upright position, relative to the ground upon which the targets are positioned. The objective is for a user to cast the fly replica onto the target without striking the fish replica with either the fly replica or the fly line. In the method disclosed herein, multiple targets, of varying sizes and at varying distances, may be used to convert this system into a game of skill.

8 Claims, 3 Drawing Sheets

APPARATUS AND METHOD FOR IMPROVING FLY FISHING CASTING

CROSS-REFERENCE TO RELATED APPLICATIONS

This application claims priority to copending U. S. provisional application entitled, "An Apparatus And Method For Improving Fly Fishing Casting," having Ser. No. 60/150,220, filed Aug. 23, 1999, which is incorporated by reference herein in its entirety.

BACKGROUND OF THE INVENTION

1. Technical Field

The present invention is generally related to apparatuses for improving fishing techniques and skills, and thereby potentially improving both fishing success and enjoyment. More particularly, the present invention is related to an apparatus and method for improving a fisherman's fly fishing casting technique.

2. Description of the Related Art

Fly fishing has become a very popular sport. It provides a great deal of enjoyment and challenge to anglers everywhere. However, perhaps the most important aspect of fly fishing is the difficult techniques of casting the "fly." More specifically, it is important for a fisherman to be able to consistently cast a fly replica into a desired location, or "target area." This location is typically and hopefully near a fish.

The presentation of the fly to a fish is critical to fly fishing success. Casting to the wrong spot may either result in no response by the fish, or may result in "spooking," or frightening, the fish. Neither result is desired since the goal of fly fishing is to convince the fish that an imitation of a living creature attached to the end of a line is a real "fly."

The most important and effective, yet most often ignored method of improving fly casting ability is practice. An angler can practice casting technique by merely "blind" casting out into a pond or a lawn. Although this form of practice will likely improve technique and help with the pure mechanics of casting in order to truly improve accuracy, an angler needs to focus his/her casting to specific targets. Such "blind" casting will likely do very little to improve casting accuracy.

Not only is such "blind" casting not very useful in improving casting accuracy, this form of practice is not very enjoyable to most anglers. If the angler enjoys the time spent practicing, the angler is more likely to practice and thereby increase his/her chances of fly fishing success. Thus there is a need in the art for an effective, useful, and inexpensive apparatus and method that enables a user to practice casting and enjoy the time spent practicing. The apparatus and method described herein, in both the text and figures, seeks to remedy the problems in the art and provide a method and apparatus for improving the fly casting ability of fly fishermen.

SUMMARY OF THE INVENTION

The present invention provides an apparatus and method for improving the casting ability of a fly fisherman. The apparatus preferably comprises a fly rod with fly line and a fly replica attached to an end of the fly line. The fly replica preferably further comprises an adhesive material on a surface of said fly replica. The preferred embodiment also comprises a target area for receiving the fly replica. The target area comprises a target and a fish replica. The target has a base portion and a second adhesive material on an upper surface of the target base portion. The fish replica is positioned adjacent to the target and preferably secured by support elements. The support elements keep the fish replica in an upright position, relative to the ground upon which the target is positioned. The objective is for a user to cast the fly replica onto the target without striking the fish replica with the fly replica or the fly line.

The present invention can also be viewed as providing a method for improving the fly casting technique of a fly fisherman. In this regard, the method can be broadly summarized by the following steps: (1) obtaining a fly rod with a fly line attached thereto; (2) attaching a fly replica to an end of the fly line, the fly replica having a first adhesive material; (3) placing a target upon a ground, the target comprising a surface having a second adhesive material, compatible with the first adhesive for securing the fly replica to the surface of the target; (4) placing a fish replica adjacent to the target, a head of the fish replica in close proximity to a periphery of the target; and (5) casting the fly replica at the target so as to permit the fly replica to strike the target, while avoiding striking the fish replica with either the fly line or the fly replica.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Broadly described, the present invention comprises an apparatus and a method which enables a fisherman to practice fly fishing casting, and thereby have the opportunity to become a more proficient fly fisherman. The apparatus will first be described, followed by a description of a preferred method for using the apparatus.

A. An Apparatus For Improving Fly Casting

Figure 1:
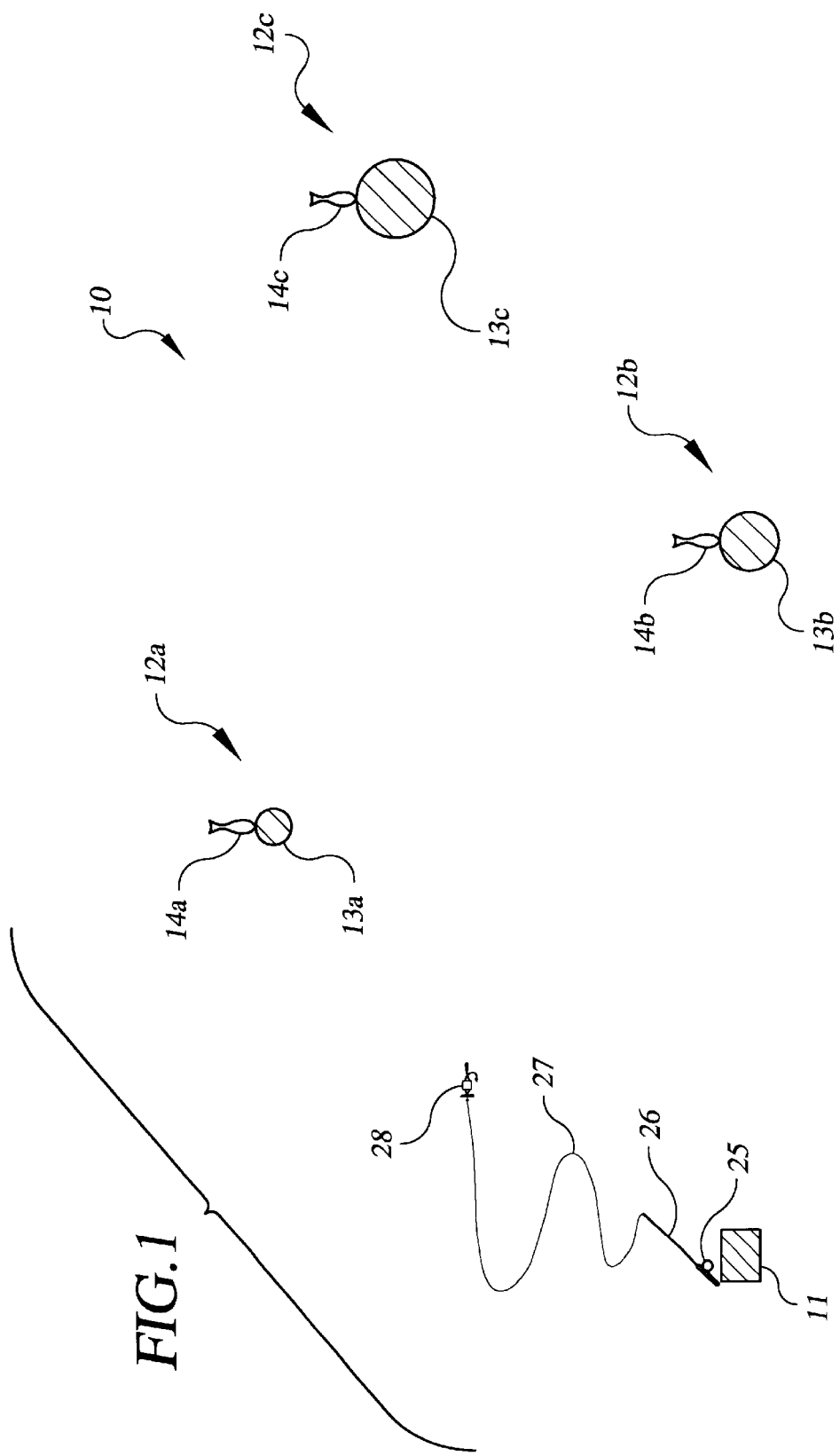
FIG. 1 is a top view of the casting improvement system of a preferred embodiment to the present invention.
Figure 4:
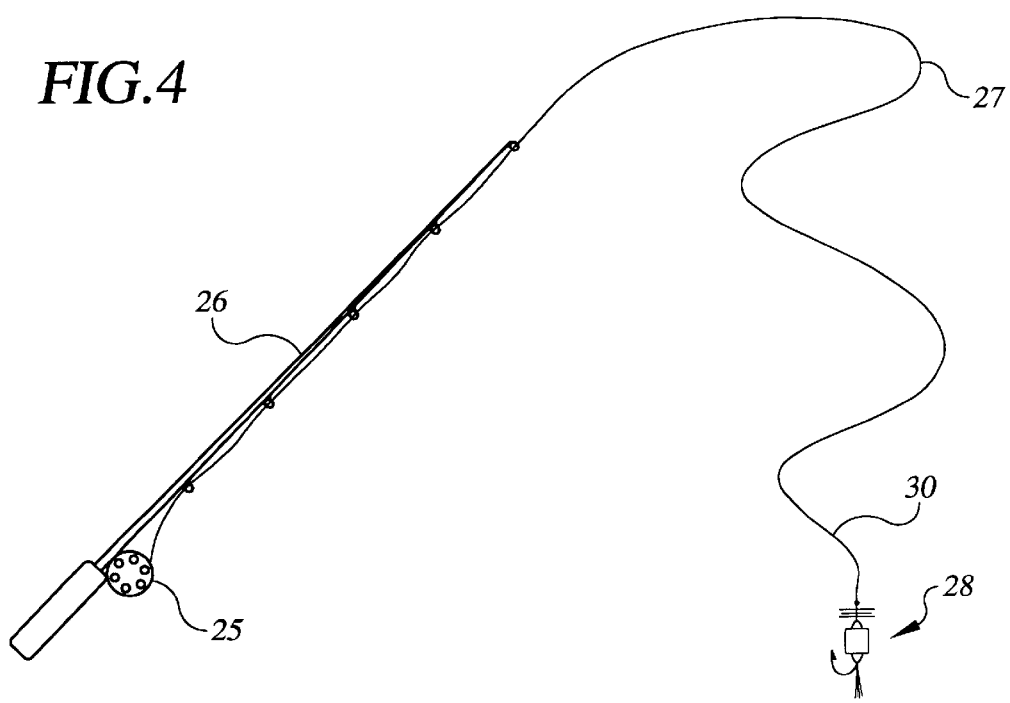
FIG. 4 is a side view of a fly rod and fly reel used in the casting improvement system depicted in FIG. 1.

The casting improvement system 10 disclosed herein and depicted in FIG. 1, has been developed to duplicate actual fishing situations as closely as possible. The goal of the system 10 is to force a user 11 to deliver a fly replica to one or more specific target areas 12a–12c. Broadly described, the basic elements of the casting improvement system 10 comprise the target areas 12a–12c and a user 11 having a fly fishing rod 26 and fly reel 25. The user 11 also has a fly replica 28 affixed to an end of the fly rod's fly line 27 via a leader material 30. The preferred embodiment of a fly rod and reel is depicted in FIG. 4. The system 10 of the present invention, as depicted in FIG. 1, preferably comprises multiple target areas 12a–12c. Each target area 12a–12c of the system 10 comprises a target 13a–13c and a fish replica 14a–14c.

Figure 2:
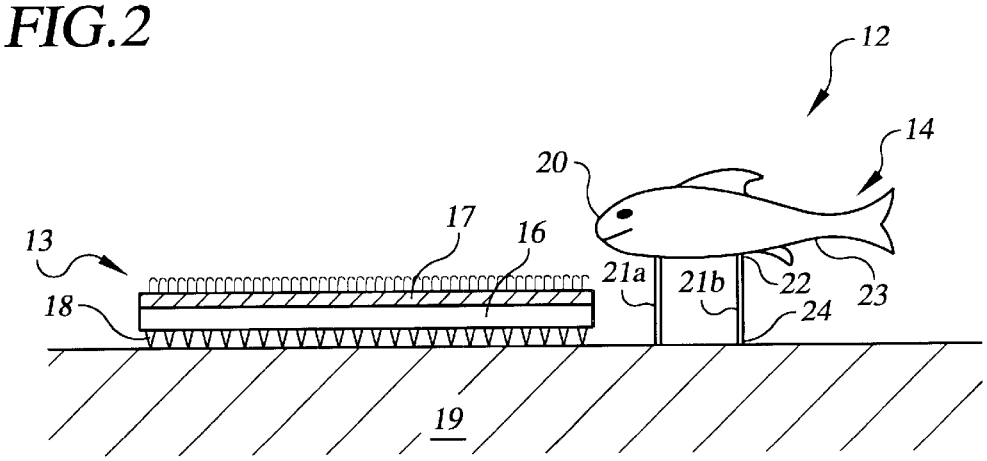
FIG. 2 is a side view of a target area for use in the casting improvement system depicted in FIG. 1.

FIG. 2 depicts a detailed side view of one of target areas 12a–12c. The target area of FIG. 2 is generally represented by the numeral 12. As noted above, the target area 12 is preferably defined by a target 13 and a fish replica 14. Although the fish replica 14 is not necessary to the system 10 described herein, the fish replica 14 aids in the effectiveness of the apparatus and method disclosed herein. Therefore, use of a fish replica 14 is preferred. Typically and preferably, one fish replica 14 will be paired with a single target 13 to form a target area 12, as shown in FIG. 2. Of course, more than one fish replica 14 may be used with a single target 13.

The targets 13 of the present invention may be any shape and size, the selection of which is not a critical part of the present invention. The preferred embodiment of a target 13, however, comprises targets that are approximately round in shape from a top view, as shown in the overhead depiction of the system 10 in FIG. 1. As best shown in FIG. 2, the targets 13 are preferably constructed of a base portion 16 that is covered on one surface with an adhesive material 17. See FIG. 2. Although the presence of an adhesive material 17 is not necessary to the present invention, it is preferred in that it lends greater enjoyment for the user 11, as will be described in greater detail below. The adhesive material 17 could be as simple as double-sided tape; however, the preferred adhesive material 17, as depicted in FIG. 2, is a hooked portion of Velcro®, or other hook and loop fastening material.

The hooked portion of Velcro® typically may be purchased in rolls or sheets. The hooked portion of Velcro® material may then be cut into a size that corresponds to the base portion 16 of the target 13. As one with skill in the art is aware, one side of the Velcro® material is flat and relatively stiff. The other side of the Velcro® material comprises the "hooks" that are used to ensnare a corresponding "loop portion" of the Velcro® hook and loop fastening material. In assembling the target 13, the hooked portion of Velcro® may be affixed to the base portion 16 of the target 13 in a variety of manners. However, it is preferred that the flat side of the Velcro® be adhesively glued to a relatively flat side of the base portion 16. Alternatively, the hooked portion of Velcro® may be affixed by staples, tape, nails, screws, or the like.

The base portion 16 of the target 13 can be constructed of a variety of materials. For example, the base 16 may comprise a rubber pad having a thickness of approximately one-eighth of an inch up to approximately two inches, although not limited to rubber pads in this thickness range. A rubber pad is relatively heavy, thereby tending to keep the targets in place while the system 10 is in use. Practical shipping considerations, however, make the preferred embodiment for the base 16 a cleated mat, similar to a common office chair mat. A cleated mat is depicted as the base portion 16 of the target 13 shown in FIG. 2. As known by one of ordinary skill, a cleated mat typically has a relatively smooth upper surface and a lower surface having a plurality of "cleats" 18. The hooked portion of Velcro® should preferably be affixed to the relatively smooth upper surface of the cleated mat, as shown in FIG. 2. The target 13 of the preferred embodiment is then placed on the ground 19 in the preferred arrangement depicted in FIG. 1.

The cleated mat 16 is the preferred base material for several reasons, such as the fact that it is relatively light, but durable. The cleats 18 are also beneficial in that they assist in keeping the target 13 in a single location while a user 11 is using the casting improvement system 10, as shown in FIG. 1. The target 13 of the preferred embodiment is secured by the engagement of the cleats 18 with the ground 19, as depicted best in FIG. 2. Alternatively, or additionally, it may be desirable to more securely anchor the target 13 to the ground 19. To this end, the target 13 may be staked, or pinned, to the ground 19. This alternative feature is not depicted in FIG. 2.

Targets 13 may not only vary in thickness, depending on manufacturing materials used for the base portion 16, but the targets 13 may also comprise a variety of sizes. As noted above, the preferred shape of the target 13 is round, though the preferred embodiment of the casting improvement system 10 is not limited to round targets. In a round configuration, the targets 13 preferably range from 36 inches in diameter down to 12 inches in diameter. In the preferred embodiment, depicted best in FIG. 1, there are three targets 13a, 13b, 13c having diameters of 12 inches, 18 inches and 24 inches, respectively. The range of target sizes add to the interest and challenge of the system 10 for the user 11. Using targets of varying sizes also permits the user to further increase his/her skill level as he/she becomes a more proficient fly fishing caster.

Figure 3:
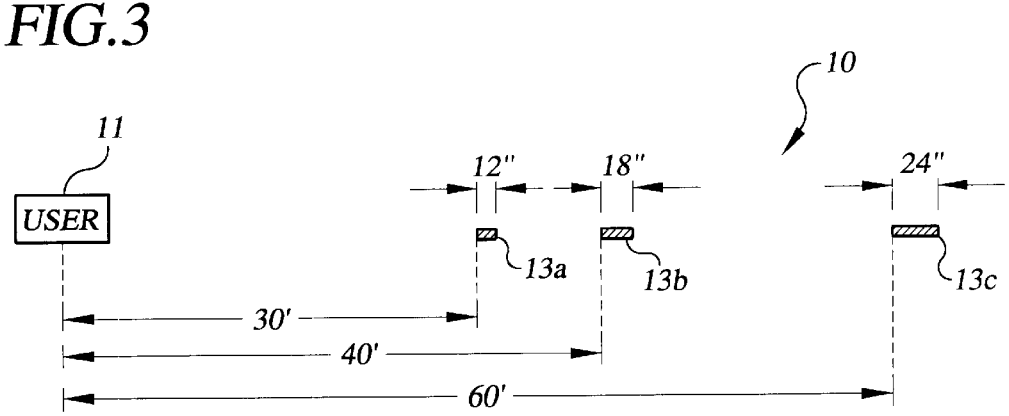
FIG. 3 is a side schematic view of the casting improvement system depicted in FIG. 1.

The targets 13 are positioned, typically on the ground 19, various distances away from the angler. As shown in FIG. 3, the first, and often smallest target 13a, is preferably positioned at a distance of approximately 30 feet from the user 11. The second target 13b is preferably positioned at a distance of 40 feet from the user 11. Finally, the largest target 13c is preferably positioned at a distance of approximately 60 feet from the user 11. Further, the targets 13a–13c, as shown in FIG. 1, are preferably positioned at varying angles from the user 11. The use of different size targets 13a–13c, at varying distances and angles, adds to the challenge as well as the teaching ability of the present apparatus and method.

As noted above in reference to FIG. 2, the target area 12 also preferably comprises a fish replica 14. The fish replica 14 may be constructed from a variety of materials. For example, the fish replica 14 may be cast plastic, rubber, or even inflatable. The preferred fish replica 14 comprises a blank cast, such as can be obtained from a taxidermist. The blank cast can then be decorated as desired in order to more accurately resemble a fish. Regardless of the material used, the fish replica 14 is preferably fashioned with support elements 21a, 21b to keep the fish replica 14 oriented upright in relation to the ground 19. The support elements 21a, 21b of the preferred embodiment typically moveably secure the fish replica 14 to the ground 19. The preferred embodiment for support elements 21a, 21b comprise a dowel rod with a first end 22 inserted into an underside of the fish replica body 23 and a second end 24 for insertion into the ground 19. Alternatively, the second end 24 of the dowel rod 21a, 21b may be securely attached to a base portion (not depicted), such as by glue, nails, or other appropriate attachment device. Such a base portion (not depicted) may comprise a relatively thin metal disk.

Additionally, in other embodiments, the dowel may be nothing more than a stiff metal wire. Alternatively, the fish replica 14 could be fashioned such as to attach directly to the base portion 16 of the target 13. For example, an L-shaped structure may connect at one end to the underside of the fish replica body and to the base portion of the target at the other end.

Preferably, the target areas 12 disclosed herein will have one fish replica 14 for each target 13, such that each target area 12 comprises one fish replica 14 and one target 13. The fish replica 14 is preferably placed near its associated target 13, as depicted in FIG. 2, with the "nose" 20 of the fish replica 14 near an outer periphery of the target 13. It should be emphasized that the fish replicas 14 are not necessary components of the present invention; however, the replicas 14 serve an important purpose in the preferred embodiment.

The fish replica 14 that is positioned with each target 13 has several purposes. First, the fish replica 14 gives the user perspective on the target 13 and the system 10. Rarely will a fisherman ever be aiming at a "target" when fishing. More commonly, the fisherman will seek to position a fly relative to the location of a fish in the water.

Therefore, use of a fish replica 14 with the system 10 described herein will permit the user 11 to gain perspective on his/her true objective when fishing.

Use of a fish replica 14 with the present system 10 also assists the user 11 in casting to the proper side of the target 13 as he/she would need to under actual fishing conditions. Additionally, use of the fish replica 14 enables a user 11 to judge whether a minor "miss" of the target 13 would have created a serious problem when fishing. Of course, a cast is generally proper when the fly replica 28 makes contact with the target 13. However, the user 11 generally does not want to miss the target to the side of the fish replica 14. In a real fishing situation, casting on top of a fish would likely "spook" the fish. However, if the fisherman missed to the other side of the "target," the fish would not likely be "spooked" and the fisherman could simply recast and try again. Thus, the present invention teaches the user to miss away from the fish replica 14, thereby in a real fishing situation, the user 11 will not likely "spook" the fish, even if the user 11 misses the target 13.

Not only does the apparatus of the present invention comprise the components of a target area 12, as outlined above, but the system 10 also comprises a fly rod 26 and fly reel 25, with fly line 27 and a fly replica 28. See FIG. 4. The fly rod 26, fly reel 25, and fly line 27 used with the present system 10 may be of any typical variety well known to those with ordinary skill in the art. The end of the fly line 27 preferably comprises a leader material 30, as is common in actual fishing situations. The flies 28 of the present invention 10 are preferably designed to adhere to the adhesive material 17 of the target 13. Preferably, the adherence is not permanent, but at least temporary.

Figure 5A:
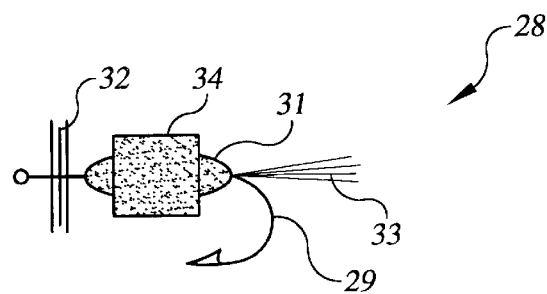
FIG. 5A is a side view of a fly replica that may be used with the casting improvement system of FIG. 1.

The flies 28 can be tied to resemble the flies used in actual fishing situations in both size and weight. FIG. 5A depicts a first preferred embodiment of a fly 28 for use in the present system 10. As one with skill in the art is aware, flies 28 used in fishing typically comprise thread, feathers, yarn, and/or other materials tied about a metal hook 29. In FIG. 5A, a fly 28 comprising a body portion 31, a hackle portion 32, and a tail portion 33 is depicted. Although not all flies will have these elements, many flies do. One with skill in the art will be well-aware of how to manufacture, or obtain, such flies.

The same materials used in "real" flies for fishing may be used for the flies 28 of the system 10 described herein. Although the adherence of the flies 28 to the target 13 may be achieved in a variety of ways, usually depending on the particular construction of the target 13, the preferred embodiment of a fly 28 for use with the apparatus and method described herein further comprises a piece of the looped portion of Velcro® 34 wrapped, glued, or tied to the fly body 31. Of course, the looped portion of Velcro® 34, alternatively, may completely comprise the body of the fly 28. One with ordinary skill in the art will readily understand how to manufacture a fly similar to the fly of the preferred embodiment 28.

Use of other materials normally used in fly construction, such as feathers and lead eyes, is preferred so that the flies 28 of the present apparatus 10 roughly imitate the size, weight, and appearance of actual flies used when fishing. The looped portion of Velcro® 34 insures that the fly 28 will adhere to the target surface of the preferred embodiment, which is covered by the hooked portion of Velcro® 17. Although the fly 28 of the preferred embodiment will stick to the target 13, it will release with a simple pick up of the fly rod 29 and the caster 11 is then ready to cast again.

Figure 5B:
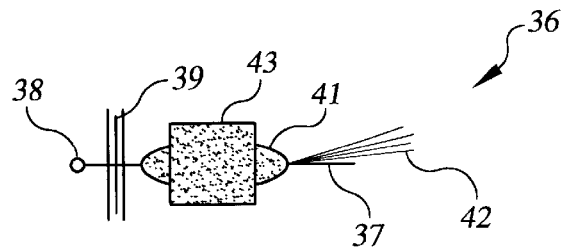
FIG. 5B is a side view of an alternative embodiment of a fly replica that may be used with the casting improvement system of FIG. 1.

Although not required by the present invention, the flies 28 tied for the purpose of this system 10 may comprise a second preferred embodiment 36, which have no actual hook on the end, as depicted in FIG. 5B. Such flies 36 may be tied on a straight metal shank 37 with an eyelet 38 for attaching to the fly line 27 via the leader material 30. The fly 36 of this second preferred embodiment, depicted in FIG. 5B, may still have a hackle portion 39, a body portion 41, and a tail portion 42. As above, the body portion 41 of the fly 36 may also comprise a looped portion of Velcro® 43 attached to the body 41 of the fly 36, as described above. This second preferred fly embodiment 36 will give the same benefits as the typical fly 28, but will also generally increase the safety of the casting improvement system 10.

B. Use Of The Casting Improvement System

To use the preferred embodiment of the system 10 described above, the target areas 12a–12c should preferably first be set up. There is no one and only "proper" way to set up the target areas 12a–12c. However, FIG. 1 depicts a typical, and the preferred, set up. The first, and smallest target 13a, is positioned at a distance of approximately 30 feet from the user 11, as best shown in FIG. 1. The second target 13b is positioned at a distance of 40 feet from the user 11, and slightly offset from the first target 13a. Finally, the largest target 13c is positioned at a distance of approximately 60 feet from the user 11 and also offset from the other two targets 13a, 13b.

Placing the targets 13a–13c in the manner just described enables the user 11 to practice almost every conceivable cast without ever moving from his/her casting position. This simulates the situation where an angler is on a boat. Because short casts are more critical, with less margin for error, the preferred target arrangement uses a small target 13a for close casts, a larger target 13b for intermediate casts, and the largest target 13c for long casts, where the angler's margin for error is the greatest.

After positioning the targets 13a–13c on the ground 19, the user 11 should then preferably position the fish replicas 14a–14c adjacent to each corresponding target 13a–13c. The replicas may be positioned at any position, but it is preferred that the "nose" 20 of each fish replica 14a–14c be positioned in close proximity to an edge of each target 13a–13c.

This configuration is demonstrated in FIG. 1 and FIG. 2.

Once the target areas 12a–12c are set up in the manner desired, the user 11 should tie his/her adhesive fly 28 onto the fly line 27 via the leader material 30. The angler 11 will attempt to cast the fly 28 onto the target areas. As noted above, a "successful" cast is one in which the fly 28 strikes the adhesive material 17 of the target 13. A successful cast is also one in which the fly line 27, or leader material 30, does not strike the fish replica 14. In an actual fishing situation, it is not desirable for the fly line 27 to strike the water above, or in front of, a fish just below the water surface. An actual fish may become "spooked" in such a situation. In this way, the preferred embodiment of the present system 10 teaches a user 11 to not only hit his/her target 13, but also to properly present the fly 28 to the "fish" 14.

Also as outlined above, the present system 10 also teaches a user 11 where his/her greatest margin for error exists. The user 11 generally does not want to miss the target 13 to the side of the target 13 where the fish replica 14 is positioned. The fly line 27, or the fly 28 will likely strike the fish replica 14 in such a situation. This is the worst possible miss. In a real fishing situation, casting on top of the fish would likely "spook" the fish. In contrast, if the fisherman missed to the other side of the "target," the fish would not likely be "spooked" and the fisherman could simply recast and try again. A cast is considered a failure if the fly line 27 or fly 28 strikes the fish replica 14. On the other hand, a cast that misses the target 13 to the side away from the fish replica 14, while not a "successful" cast, does not constitute a completely failing cast. The present invention teaches the user to miss away from the fish replica 14, thereby in a real fishing situation, the user 11 will not likely "spook" the fish.

As outlined above, the target surface 17 and the flies 28 are designed such that the two will adhere when in contact. The purpose of the flies 28 adhering to the targets 13 is to reward the caster 11 with a satisfying resistance, or "tug," when the fly 28 is accurately cast onto the adhesive surface 17 of the target 13. This tug not only signifies a successful and accurate cast, but the tug is designed to loosely, and momentarily, simulate the resistance offered by a fish striking the fly.

Although the fly 28 will stick to the target 13, it will preferably release with a simple pick up of the fly rod 26 and the caster 11 is then ready to cast again. The angler may cast to the same target 13, or to another target 13 if multiple target areas 12 are used. Although the preferred embodiment of the apparatus utilizes three targets 13a–13c and three fish replicas 14a–14c, the system 10 may utilize one, or any other number of fish/target combinations.

In the preferred method of operation, the angler 11 will continue this practice in order to increase his/her casting proficiency. Obviously, the apparatus and method described above is a type of game that the angler plays. As such, one or more persons may participate, either sequentially, or at the same time. It may be enjoyable to keep a type of "score." Score may be kept in any number of ways in order to compare one angler to another, or even one angler to a preset, standard score.

By way of example, a typical game may comprise user 11 being given a set number of casts, such as ten casts. The user will then typically be given a set period of time to perform the ten casts, such as two minutes. The user 11 is then granted one point for hitting the first target 13a, two points for hitting the second target 13b, and three points for hitting the third target 13c. The user 11, in this example game format, is penalized 5 points if he/she at any time strikes a fish replica 14a–14c with the fly 28 or the fly line 27. After the ten casts are completed, or the time expires, the user's score is totaled. The user with the highest score is the "winner" of the game. Many variations on the method would be obvious to one with ordinary skill in the art and are intended to be included within the scope of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An apparatus for improving the casting ability of a fly fisherman, comprising:

a fly rod;

a fly line having a first and a second end, said line attached to said fly rod at the first end of said line;

a leader material having a first and a second end, the first end of said leader material attached to the second end of said fly line;

a fly replica having a first adhesive material on a surface of said fly replica, said fly replica attached to the second end of said leader material;

a target having a base portion and a second adhesive material on said base portion, said base portion comprising a cleated mat, said cleated mat resting on the ground such that a plurality of cleats grasp the ground; and a fish replica adjacent to said target, said fish replica having support elements for protruding into said ground such that said fish replica is maintained in an upright position.

2. The system of claim 1, wherein said first adhesive material comprises a loop portion of a hook and loop material and said second adhesive material comprises a hook portion of the hook and loop material.

3. An apparatus for improving the casting ability of a fly fisherman, comprising:

(a) a fly replica, said fly replica comprising:
       (i) a metal shank having a first end and a second end,
       (ii) an eyelet on a first end of said shank, and
       (iii) a first adhesive material affixed to said shank, wherein said fly replica may be attached to a fly rod by securing a fly line to said eyelet;

(b) a target comprising a second adhesive material, wherein said first and second adhesive materials will adhere to one another when in contact, said target further comprising a plurality of cleats, said target resting on a ground surface such that said plurality of cleats grasp the ground surface; and (c) a fish replica having a support mechanism to maintain said fish replica in an upright relationship to the ground, wherein said fish replica may be placed adjacent to said target.

4. The apparatus of claim 3, wherein said fly replica further comprises a tail portion protruding from said second end of said shank.

5. The apparatus of claim 4, wherein said fish replica comprises an inflatable material.

6. A system for improving the casting ability of a fly fisherman, comprising:

a fly rod;

a fly line having a first and a second end, said line attached to said fly rod at the first end;

a fly replica comprising a first adhesive material on a surface of said fly replica, wherein said fly replica is attached to said second end of said fly line;

a target area for receiving said fly replica, said target area comprising a target having a base portion, said base portion comprising a cleated mat where a second adhesive material on a surface of said cleated mat, and a fish replica adjacent to said target, said fish replica having support elements for keeping said fish replica in an upright position.

7. The system of claim 6, wherein said first adhesive material comprises a loop portion of a hook and loop material and said second adhesive material comprises a hook portion of the hook and loop material.

8. The system of claim 7, wherein said target is round.

* * * * *